(No Model.) 3 Sheets—Sheet 1.
W. GRUNOW, Jr.
TROLLEY AND TROLLEY SUPPORT FOR ELECTRIC CARS.
No. 567,975. Patented Sept. 22, 1896.
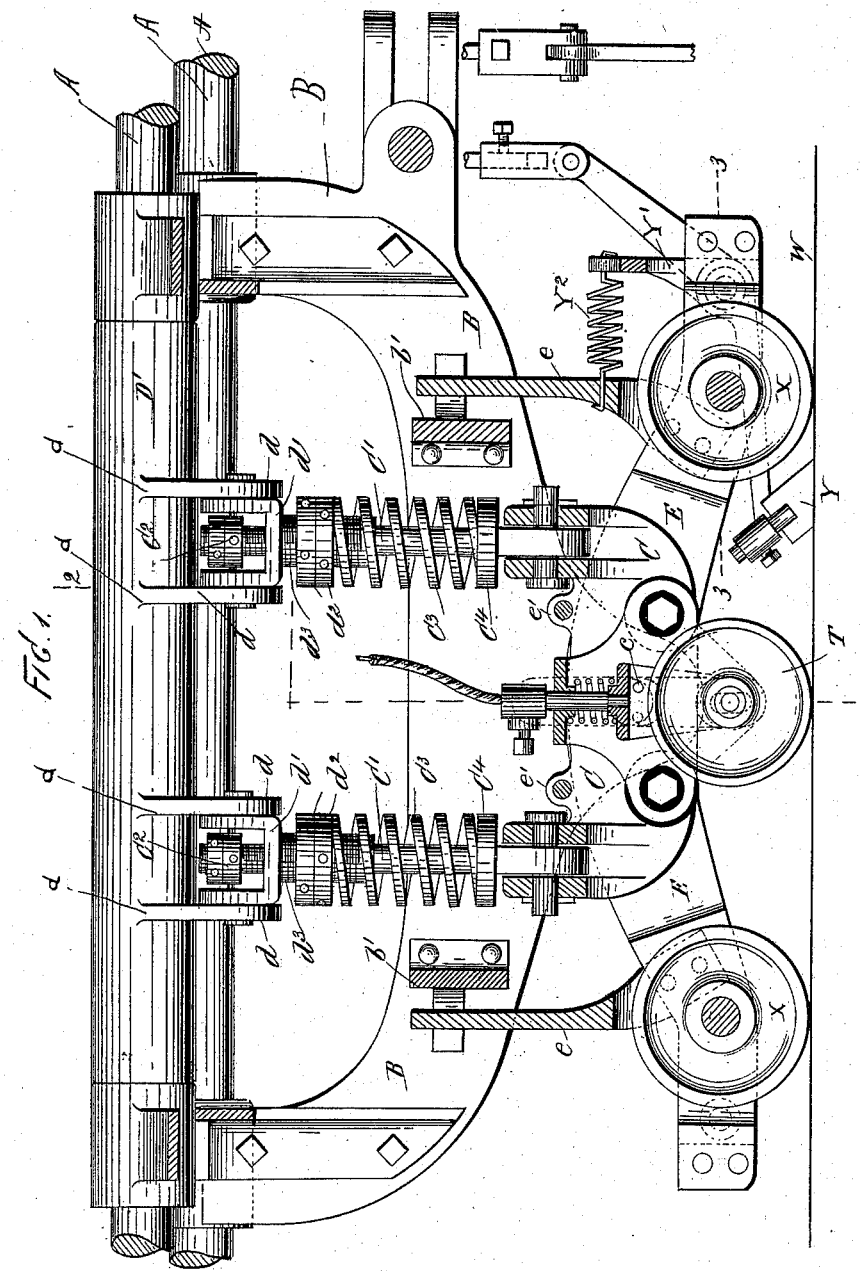

(No Model.) 3 Sheets—Sheet 2.
W. GRUNOW, Jr.
TROLLEY AND TROLLEY SUPPORT FOR ELECTRIC CARS.
No. 567,975. Patented Sept. 22, 1896.
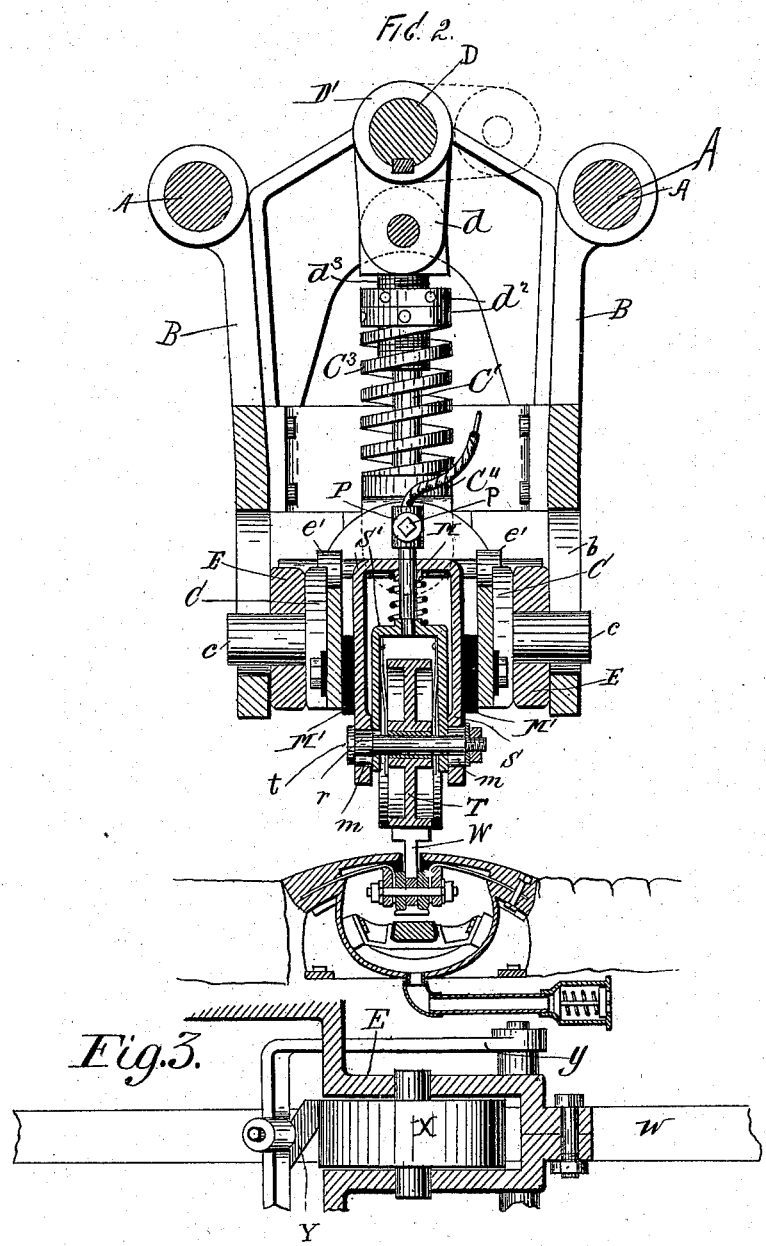
WITNESSES:
John Buckler,
C. Gerst
INVENTOR
William Grunow, Jr.
BY
Edgar Tate & Co
ATTORNEYS (No Model.) 3 Sheets—Sheet 3.

W. GRUNOW, Jr.
TROLLEY AND TROLLEY SUPPORT FOR ELECTRIC CARS.

No. 567,975. Patented Sept. 22, 1896.

WITNESSES:
John Buckler,
C. Gerst

INVENTOR
William Grunow, Jr.
BY
Edgar Tate & Co
ATTORNEYS.

UNITED STATES PATENT OFFICE.

WILLIAM GRUNOW, JR., OF BRIDGEPORT, CONNECTICUT, ASSIGNOR OF ONE-HALF TO ZALMON GOODSELL, OF SAME PLACE.

TROLLEY AND TROLLEY-SUPPORT FOR ELECTRIC CARS.

SPECIFICATION forming part of Letters Patent No. 567,975, dated September 22, 1896.

Application filed September 23, 1895. Serial No. 563,329. (No model.)

*To all whom it may concern:*

Be it known that I, WILLIAM GRUNOW, Jr., a citizen of the United States, and a resident of Bridgeport, in the county of Fairfield and State of Connecticut, have invented certain new and useful Improvements in Trolleys and Trolley-Supports for Electric Cars, of which the following is a specification, reference being had to the accompanying drawings, forming a part thereof, in which similar letters of reference indicate corresponding parts.

This invention relates to trolley or contact wheels for electric railroads, and particularly to that class thereof which are adapted for use in connection with underground conductors, and in a system in which a depressible rail is employed, said rail being depressed by a car or by the trolley frame or support connected therewith into contact with the conductor, which is arranged in a conduit below said depressible rail, such as is shown and described in an application for a patent filed by me on the 21st day of October, 1895, and serially numbered 567,139.

The invention is fully disclosed in the following specification, of which the accompanying drawings form a part, in which—

Figure 4:
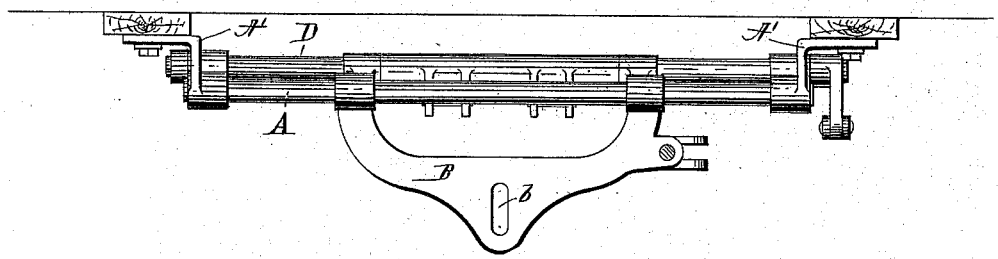
Figure 5:
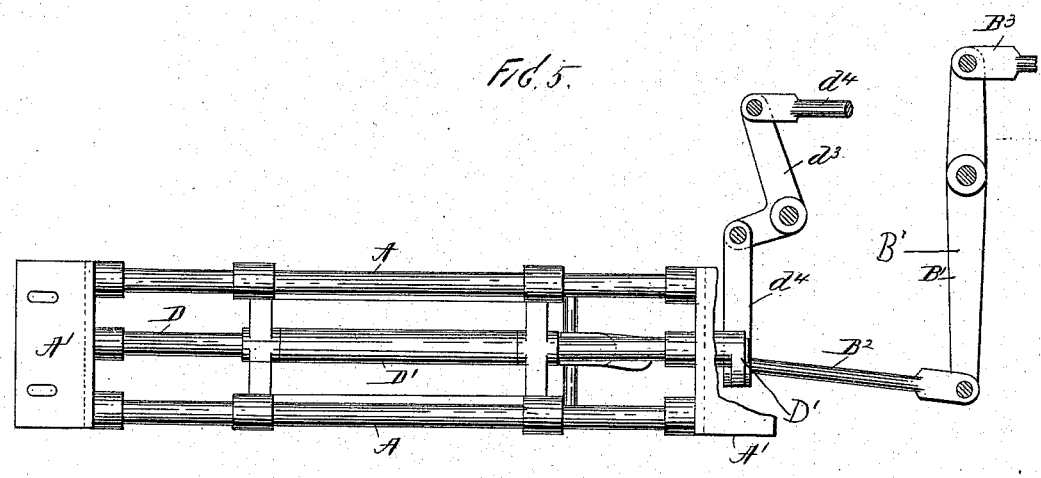
Figure 6:
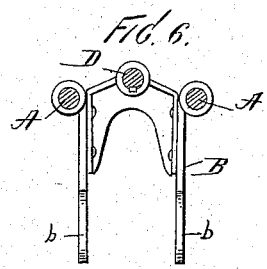

Figure 1 is a sectional side elevation of my improved trolley-support; Fig. 2, a transverse vertical section on the line 2 2 of Fig. 1; Fig. 3, a section or partial section on the line 3 3 of Fig. 1; Fig. 4, a side elevation of the frame from which the trolley is suspended, showing also the supports of said frame; Fig. 5, a plan view thereof, and Fig. 6 a sectional end elevation.

In the practice of my invention I employ a frame consisting of guide rods or bars A, which are held parallel and connected with the under side of a car or the car-truck by end brackets or hangers A', said brackets being arranged midway between the tracks of the car and in a line directly over the electric rail, which, as will be understood, is arranged midway of the rails of the track and parallel therewith. The bars of this frame serve to support and as guides for a rigidly-built frame B, which is free to slide along the bars, longitudinally of the car and parallel with the rails of the track, and is operated by means of a lever B' and connecting-rods $B^2$ and $B^3$, the latter being in connection with a ratchet-lever (not shown) in the car, or upon the platform of a car. As will be understood, the frame B is thus placed under control and can be slid or moved in either direction, and held as desired, to shift the trolley-wheel when the same stops upon a dead-center. The depressible rail W is made in sections, so that only a very limited portion thereof at a time is in contact with the electric conductor.

The frame B is provided at its lower side with two opposite vertical slots $b$, which serve as guides for the trunnions $c$ of the frame C. At the upper side of the supporting-frame, and midway between the guide-rods A and parallel thereto, is held a key-seated shaft D, and a crank-sleeve D' is splined to this said shaft D in such manner that it is free to slide thereon, but not to rotate unless the shaft D is rotated, and it is held between the two opposite sides of the frame B B by its bearings, as clearly shown in Figs. 3, 5, and 6. This sleeve has projections forming cranks $d$, which are pivotally connected with couplings $d'$, which are suspended between the said cranks, which are arranged in pairs, as clearly shown in Fig. 1, and these couplings are each provided with a tubular screw-threaded extension $d^3$, on the lower sides thereof, on which are mounted a pair of nuts $d^2$. These tubular extensions or sleeves serve as guides to the spring-operated rods C', which are connected at their lower ends by means of pivotal pins to the frame C. The rods C' are screw-threaded at their upper ends, and mounted thereon are a pair of nuts $C^2$, said rods being passed through the couplings $d'$ and through the nuts $d^2$, and powerful expansive spiral springs $C^3$ are mounted on said rods, the pressure of which is exerted on the heads $C^4$, the lower ends of the rods C', and on the nuts $d^2$, which are mounted on the sleeves $d^3$, which abut against the couplings $d'$, and by means of these nuts the pressure of each of the springs $C^3$ may be regulated as desired.

The springs $C^3$ are preferably of such length that they exert their pressure only when the shaft D is turned to force the rods C' and the frame C downwardly. By reversing the rotation of the shaft D the couplings $d'$ are forced against the under side of the nuts $C^2$ upon the upper ends of the shafts C', thus releasing the strain of the springs and pulling the frame C upwardly.

The operation of the shaft D and its attachment is effected by means of the crank-lever $d^3$ and its connecting-rods $d^4$, one of which connects with said shaft D, as shown in Fig. 5, and the other of which connects with a ratchet-lever (not shown) in the car or on the platform of the car.

The trunnions $c$ of the pressure-frame C pass through the opposite side of a rocking or supplemental frame E, which carries a roller X at its opposite ends, and to this frame E and directly over the rollers X are attached upwardly-directed standards $e$, which pass between guide-braces $b'$, secured to or connected with the frame B, and which serve to steady and maintain in proper position the rocking or supplemental frame E when its rollers X are running over the electric rail, which is indicated at W. At the ends of this rocking or supplemental frame E, in close proximity to the rollers X, are arranged scrapers Y, which may be made of any desired material, according to the seasons of the year. In winter time these scrapers may be made of metal, and may be used to scrape the ice and slush or sleet and snow that may collect on the rail W or on the top of the conduit-rail, and in summer, when necessary, a vulcanized rubber strip or other suitable material may be substituted to keep the rail clean and insure a proper contact for the trolley or contact wheel T.

The scrapers Y are mounted in an angular frame Y', one arm of which extends across the electric rail and another arm of which extends upwardly, as shown in Fig 1, and is connected with a spiral spring $Y^2$, the other end of which is connected with one of the vertical standards $e$, and by means of this spring any desired pressure may be brought to bear upon the scrapers, and these scrapers may be independently operated from the cab or from the platform of a car by means of sliding rods, crank-levers, and connecting-rods, (not shown,) in such manner that one scraper may be used at a time, according to the direction in which the car is going.

At the upper part of the pressure-frame C are attached projections or shoulders $e$, as shown in Fig. 1, which extend over the sides of the rocking or supplemental frame E to prevent the same from rocking or dipping beyond a desired point, and it will be obvious that the rollers X will not be subjected to severe blows when rolling or moving over irregularities on the electric rail by reason of the frame E being pivoted, and consequently free to rock, or the ends thereof to move up and down.

Within the rocking or supplemental frame E, and situated midway between the rollers X and the sides of the frame, is a trolley-frame M, which is securely bolted thereto and electrically insulated therefrom in the best possible manner and by means of the best known insulating material, said insulating material being shown at M' in Fig. 2. The trolley or contact wheel T has an independent pressure of its own upon the electric rail W, making connection with it before the rollers X are brought to bear thereon to depress said rail into contact with the conductor, which in this system, or any system similar to this, is arranged, as hereinbefore stated, below the electric rail W, which is flexible and depressible, and said trolley-wheel being so arranged as to leave the rail after contact between the flexible rail and the conductor has been broken when raising the rollers X from the electric rail.

The trolley or contact wheel T is mounted on a pivotal pin or axle $t$, which is passed through the fork or yoke S to which it is keyed, so that it does not revolve with the wheel T, and the fork S is provided with a stem which passes upwardly through a guide hole or opening in the frame M, and mounted thereon is a spiral spring which bears against the lower surface of the upper side of the frame M and also upon the fork or yoke S of the trolley or contact wheel T, as clearly shown in Fig. 2, and the sides of the mounting or frame M are provided at their lower ends with vertical slots $m$, through which the pivot-pin or axle $t$ of the trolley or contact wheel T is passed and by means of which said trolley or contact wheel is given a vertical movement.

To the opposite inner sides of the fork or yoke S of the trolley-wheel are secured flat springs S', as shown in Fig. 2, and said springs are adapted to bear against the ends of the hub of the trolley or contact wheel, so as to more effectually collect and carry the current, and attached to the upper end of the stem of the yoke or fork S' is a binding-post P, whereby electric connection is made with the motor and the usual controllers, rheostats, &c., connected therewith.

My invention is not limited to the exact form, construction, and arrangement of parts shown and described, and I therefore reserve the right to make all such alterations therein and modifications thereof as fairly come within the scope of the invention.

While I have shown only two of the rods C' and of the springs $C^3$ mounted thereon, it is evident that a greater number of these rods and springs may be employed, and other changes in and modifications of the construction described will readily suggest themselves to those skilled in the art to which this invention relates.

Having fully described my invention, I claim and desire to secure by Letters Patent—

1. The combination with the bottom of the car or its truck, of supporting-rods which are connected therewith, a frame suspended from said rods, a pressure-frame connected with and suspended from said frame, a crank-shaft mounted on the top of said frame, a crank sleeve or shaft mounted thereon, rods connected with said crank sleeve or shaft, and with the pressure-frame, springs mounted on said rods, and operating to depress said pressure-frame, and a supplemental or rocking frame connected with said pressure-frame, provided with a trolley-wheel, substantially as shown and described.

2. The combination with the bottom of the car or its truck, of supporting-rods which are connected therewith, a frame suspended from said rods, a pressure-frame connected with and suspended from said frame, a crank-shaft mounted on the top of said frame, a crank sleeve or shaft mounted thereon, rods connected with said crank sleeve or shaft, and with the pressure-frame, springs mounted on said rods, and operating to depress said pressure-frame, and a supplemental or rocking frame connected with said pressure-frame provided with a trolley-wheel, said supplemental or rocking frame being also provided at each end with rollers, which are adapted to be brought in contact with a depressible electric rail, substantially as shown and described.

3. The combination with the bottom of a car or its truck, of a main frame suspended from rods which are secured thereto, a pressure-frame connected with said main frame, and capable of vertical movement, and a supplemental or rocking frame connected with said pressure-frame, a crank-shaft connected with the supporting-frame, and provided with a crank-sleeve which is mounted thereon, rods which are pivotally connected with said pressure-frame, and with said crank-sleeve, expansive springs on said rods and acting to depress said pressure-frame, said supplemental or rocking frame being provided with rollers at each end thereof, which are adapted to be brought in contact with a depressible rail, and said frame being also provided centrally thereof with a contact or trolley wheel, which is capable of vertical movement, and which is in electrical connection with the depressible rail, and a scraper connected with said supplemental or rocking frame, said parts being constructed, combined and arranged, substantially as shown and described.

4. A trolley-support of the character described, connected with the flooring of a car, adapted to be used in connection with a depressible rail which is forced in contact with an electrical conductor, consisting of a frame beneath the car, or its truck, of rods suspended by hangers attached to the flooring of the car or its truck, and adapted to be reciprocated forward or backward, said frame being connected with a supplemental or rocking frame arranged longitudinally thereof, and which is provided at each end with a roller, adapted to run on the depressible rail, and force the same downwardly, and the central portion of said frame being provided with a trolley or contact wheel, adapted to be in constant contact with the depressible rail, which in turn is forced downwardly to contact with the electrical conductor, substantially as described.

5. A trolley-support of the character described, secured to the flooring of a car or truck frame, and adapted to be used in connection with a depressible rail, which is constructed to be forced in contact with the electrical conductor connected below the rail, formed of parallel rods mounted in hangers beneath the platform of the car or its truck, the frame mounted on said rods and the lever intermediately pivoted and provided with links connected with the ratchet, said links to project the frame forward or backward, a supplemental or rocking frame connected to said frame longitudinally thereof, and carrying rollers at each end of the same.

6. A trolley-support of the character described, consisting of a horizontally-movable frame secured in hangers to the floor of the car, a supplemental frame connected with said frame, and being vertically movable, and provided at each end with wheels adapted to run on the depressible rail, and force the same downwardly in contact with the conductor in conduit, and a contact-wheel also carried with said supplemental frame, and springs between the supplemental frame, and the first-mentioned frame, to force the former downwardly, and a spring carried by said supplemental frame, and adapted to bear upon the contact-rail, substantially as described.

7. A trolley-support of the character described, consisting of a horizontally-movable frame secured in hangers to the floor of the car or its truck, a rocking frame connected with said frame and being vertically movable, and provided at each end with wheels adapted to run on the depressible rail, and force the same downwardly in contact with the conductor in the conduit, and a contact-wheel also carried with said supplemental frame, and springs between the supplemental frame and the first-mentioned frame to force the latter downwardly, and a spring carried by said supplemental frame, and adapted to bear upon the contact-wheel on said rail, electrical connection between the contact-wheel and the motor on a car, substantially as described.

8. The combination with a car or its truck, of a main trolley-frame secured beneath the bottom thereof, a pressure-frame connected therewith, and capable of vertical movement, a supplemental or rocking frame connected with said pressure-frame, a trolley-frame connected with said supplemental or rocking frame, and a contact wheel or trolley connected with the trolley-frame, and said rocking frame being provided at each end with a roller, adapted to be brought in contact with a depressible electric rail, and said trolley or contact wheel being capable of vertical movement, and means for forcing said supplemental frame downward, substantially as described.

In testimony that I claim the foregoing as my invention I have signed my name, in presence of the subscribing witnesses, this 20th day of September, 1895.

WILLIAM GRUNOW, Jr.

Witnesses:
CHARLES KELSEY,
HENRY F. NORCROSS.